(12) United States Patent
Straub et al.

(10) Patent No.: US 9,561,848 B2
(45) Date of Patent: Feb. 7, 2017

(54) APPARATUS AND METHOD FOR STEERING ANGLE MEASUREMENT OF AN AIRCRAFT LANDING GEAR AND AIRCRAFT LANDING GEAR

(75) Inventors: Anton Straub, Constance (DE); Joerg Meyer, Baienfurt (DE); Rainer Fritschi, Heimenkirch (DE); Michael Kopf, Kisslegg (DE)

(73) Assignee: Lienherr-Aerospace Lindenberg GmbH, Lindenberg (DE)

( * ) Notice: Subject to any disclaimer, the term of this patent is extended or adjusted under 35 U.S.C. 154(b) by 449 days.

(21) Appl. No.: 12/976,794

(22) Filed: Dec. 22, 2010

(65) Prior Publication Data
US 2011/0147514 A1 Jun. 23, 2011

(30) Foreign Application Priority Data
Dec. 23, 2009 (DE) .................. 10 2009 060 320

(51) Int. Cl.
*G01B 7/30* (2006.01)
*B64C 25/50* (2006.01)
*G01D 5/245* (2006.01)

(52) U.S. Cl.
CPC .............. *B64C 25/50* (2013.01); *G01B 7/30* (2013.01); *G01D 5/2455* (2013.01)

(58) Field of Classification Search
CPC .. G01D 5/2455; G01D 5/2275; G01D 5/2283; G01D 5/22; G01D 5/2208; G01D 5/2216; G01D 5/2225; G01D 5/2233; G01D 5/2241; G01D 5/225; G01D 5/2258; G01D 5/2266; G01D 5/2006; G01D 5/2013; G01D 5/202; G01D 5/2026; G01D 5/2033; G01D 5/204; G01D 5/2046;G01D 5/2053; G01D 5/206; G01D 5/145; G01D 5/14; G01D 5/142; G01D 5/147; G01D 5/16; G01D 5/20; G01D 5/2454; G01D 5/2457; G01D 5/2458; G01B 7/02; G01B 7/023; G01B 7/04; G01B 7/046; G01B 7/14; G01B 7/30; H01L 43/00; H01L 43/06; H01L 43/08; G01R 33/0094; G01R 15/20; G01R 15/202; G01R 15/205; B64C 25/50

(Continued)

(56) References Cited

U.S. PATENT DOCUMENTS

| 7,394,242 B2* | 7/2008 | Pradier et al. ................ 324/174 |
| 2002/0053903 A1* | 5/2002 | Kempe .................... 324/207.25 |

(Continued)

FOREIGN PATENT DOCUMENTS

| EP | 0194932 A1 | 9/1986 |
| EP | 1403622 A1 | 3/2004 |

(Continued)

OTHER PUBLICATIONS

English machine translation of the description of FR 2787761, obtained from the EPO website (http://worldwide.espacenet.com/advancedSearch?locale=en_EP), obtained Aug. 5, 2013, 16 pages.*

(Continued)

*Primary Examiner* — David M. Schindler
(74) *Attorney, Agent, or Firm* — Alleman Hall McCoy Russell & Tuttle LLP (57) ABSTRACT

The present disclosure relates to a method and an apparatus for the contactless measurement of the steering angle of an aircraft landing gear, in particular of a nose landing gear. Furthermore, this present disclosure relates to an aircraft landing gear, in particular a nose landing gear, which allows a contactless measurement of the steering angle.

13 Claims, 4 Drawing Sheets

(58) Field of Classification Search
USPC .................................................. 324/207.25
See application file for complete search history.

(56) References Cited

U.S. PATENT DOCUMENTS

| | | | |
|---|---|---|---|
| 2004/0017189 A1* | 1/2004 | Gyoergy et al. | 324/207.22 |
| 2004/0075022 A1* | 4/2004 | MacKness | 244/100 R |
| 2004/0100251 A1* | 5/2004 | Lohberg | 324/166 |
| 2004/0129091 A1* | 7/2004 | Duret et al. | 73/862.328 |
| 2007/0006650 A1* | 1/2007 | Pradier et al. | 73/488 |
| 2009/0315541 A1* | 12/2009 | Zak | 324/207.2 |
| 2010/0072988 A1* | 3/2010 | Hammerschmidt et al. | 324/207.25 |
| 2011/0288720 A1* | 11/2011 | Huchard et al. | 701/29 |

FOREIGN PATENT DOCUMENTS

| | | |
|---|---|---|
| EP | 2020379 A2 | 2/2009 |
| FR | 2578648 A1 | 9/1986 |
| FR | 2787761 A1 | 6/2000 |
| WO | 2007/110566 A1 | 10/2007 |
| WO | 2008153976 A1 | 12/2008 |

OTHER PUBLICATIONS

Great Britain Intellectual Property Office, Search Report of GB1021943.4, Apr. 21, 2011, 3 pages.

van der Linden, J.C. and H.A. Mensink, AGARD Flight Test Instrumentation Series, vol. 8 on "Linear and Angular Position Measurement of Aircraft Components," Advisory Group for Aerospace Research and Development, Paris, France, Jan. 1977, 47 pages.

* cited by examiner

APPARATUS AND METHOD FOR STEERING ANGLE MEASUREMENT OF AN AIRCRAFT LANDING GEAR AND AIRCRAFT LANDING GEAR

CROSS REFERENCE TO RELATED APPLICATION

This application claims priority to German Patent Application No. 10 2009 060 320.4, entitled "Apparatus and Method for Steering Angle Measurement of an Aircraft Landing Gear and Aircraft Landing Gear", filed Dec. 23, 2009, which is hereby incorporated by reference in its entirety for all purposes.

TECHNICAL FIELD

The present disclosure relates to an apparatus and a method for detecting the steering angle of an aircraft landing gear and to an aircraft gear with a measuring arrangement for detecting the steering angle.

BACKGROUND AND SUMMARY

In its basic function, a known aircraft nose landing gear is a shock absorber which consists of a landing gear housing and a thrust tube rotatably mounted therein. At the downwardly protruding end of the thrust tube at least one rotatably mounted nose wheel is seated. To be able to rotate the thrust tube during retraction and extension, toggle levers are used to provide a connection between the thrust tube and a rotary steering tube, wherein the rotary steering tube is rotatably mounted in the landing gear housing. A drive motor generates a rotary movement of the rotary steering tube, which is transmitted to the aircraft wheel via the thrust tube. The current steering deflection of the nose landing gear must be fed back to the aircraft system with an accuracy of better than 1.5°.

A known steering angle sensor unit for detecting the current steering deflection on the one hand has a feedback gear wheel which is firmly connected with the rotary steering tube. On the other hand, a reduction gear wheel is provided, which is coupled with a position sensor, in particular an RVDT sensor or a potentiometer, via a shaft. The gear ratio of feedback gear wheel and reduction gear wheel generally is chosen such that the angle of rotation of the sensor and/or potentiometer is limited to 360° also for a maximum steering deflection of the landing gear. This is necessary, in order to realize an absolute steering angle measurement. A disadvantage of the steering angle detection consists in the mechanical coupling between measuring device and measurement object, which can lead to massive wear phenomena on the components contacting each other.

It is the object of the present disclosure to provide the skilled person with an improved apparatus for determining the current steering deflection of an aircraft landing gear, whose component wear is reduced as compared to the known solution.

This object is solved by an apparatus for detecting the steering angle of an aircraft landing gear in particular of the nose landing gear, comprising a measuring scale which can be mounted coaxially around a rotating component and at least one sensor for the contactless detection of the steering angle by means of the measuring scale. Alternative aspects of the present disclosure are subject-matter of the dependent sub-claims.

Accordingly, an apparatus for detecting the steering angle of an aircraft landing gear, in particular a nose landing gear, includes a measuring scale which can be mounted coaxially around a rotating component for steering an aircraft landing gear. Both components accordingly have an identical axis of rotation. The measuring scale serves to identify individual measured values or a sequence of individual measured values of the rotating component. A sensor is arranged at a distance from the measuring scale and detects the measured values depicted on the measuring scale in a contactless manner. Due to the coaxial rotary movement of measuring scale and aircraft landing gear component, the current steering angle of the aircraft landing gear can be measured in a contactless manner by means of the sensor.

It is conceivable that the measuring scale is ring-shaped and guided completely around the circumference of the rotating component. Accordingly, the apparatus provides for an absolute angle determination in a rotation range from 0° to 360°. Particularly, an absolute angle determination can be performed in the range above 360°. In the present disclosure, a mechanical coupling between sensor and measurement object is omitted, whereby wear phenomena inside the measuring arrangement are noticeably reduced. The measurement signal generation of the sensor is effected continuously. Two or more sensors are redundantly arranged relative to each other in one embodiment.

It is conceivable that at least one sensor is a magnetic sensor. The measurement principle is based on a magnetic action principle between measuring scale and magnetic sensor. Particularly, the use of a magnetostrictive sensor is suitable.

The measuring scale is annularly guided around the full circumference of the rotating component and fixed to the same. The ring width may lie in the range between 10 and 50 mm, particularly in the range between 15 and 30 mm.

What is expedient is a spaced arrangement of the at least one sensor relative to the measuring scale in the range between 0.1 and 5 mm, particularly advantageously in the range between 0.1 and 1.5 mm.

In one example aspect of the present disclosure, the measuring scale consists of a magnetic tape which is made of a permanent-magnetic material. The magnetic tape bears a magnetic signature, which is realized by the precise alignment of various magnetic fields on the magnetic tape. The individual magnetic fields are characterized by pole lengths in the range from 0.1 to 5 mm, which are generated by precisely magnetizing the permanent-magnetic material. A special coding feature of the signature identifies a steering angle of 360°, so that a steering deflection above 360° can be output as absolute value.

It is conceivable that the measuring scale includes one or more tracks. The tracks can expediently be combined to a logically linked signature of the measuring scale. The measuring scale accordingly consists of one or more tracks extending parallel to each other, which can be detected in a contactless manner by means of the sensor separately and/or in parallel. It is furthermore conceivable that the sensor includes at least one reading head per track. Conceivable configurations of the single- or multi-track signature of the measuring scale include a single-track incremental track, an incremental track in conjunction with at least one code track, an incremental track in conjunction with a coarse absolute track and the realization of a vernier by means of two or more tracks.

In a further advantageous configuration possibility the apparatus of the present disclosure provides a passive measuring scale. The measuring scale advantageously is ring-shaped and substantially is made of a ferromagnetic material. On the surface of the measuring scale a mechanical structuring is formed to embody the mechanical signature/coding. The configuration of the mechanical signature of the measuring scale can be effected in a single-track or multi-track manner. What is expedient is a helical signature of the measuring scale. (Furthermore, it is conceivable that at least one track of the measuring scale represents a single-periodic sine/cosine signal.) The expansion by one further track advantageously can serve to increase the measurement resolution.

Particularly, at least one correction track is provided. It can be provided that the correction track symbolizes a constant measured value. With reference to the constant measured value deviations and/or measurement errors can be detected and suitable compensation measures can be taken. For example, by means of the correction track an axial displacement of the rotating component can be detected and compensated. The detected deviations of the constant measured value of the correction track are employed for compensation on all further tracks in one embodiment.

In a further advantageous aspect, the use of one or more ferromagnetic gear wheels as measuring scale is provided. The individual gear wheels with a different number of teeth are attached to the rotating component of the aircraft landing gear relative to each other such that a vernier is obtained. The toothing corresponds to the aforementioned mechanical structuring and/or signature.

When using a passive measuring scale, a permanent magnet expediently is provided inside the apparatus. The permanent magnet may be positioned behind the at least one sensor and magnetizes the passive measuring scale.

With the apparatus for detecting the steering angle of an aircraft landing gear in accordance with the present disclosure a measurement accuracy in the range of better than 1.5° can be achieved. Such measurement accuracies are required in particular in aircraft technology. Furthermore, the steering angle detection in the nose landing gear of an aircraft continuously provides a measurement signal for the current steering deflection of the landing gear to the landing gear computer.

The present disclosure furthermore provides an aircraft landing gear, in particular a nose landing gear, in which a mechanical coupling between measurement sensor and measurement object is omitted. This is solved by an aircraft landing gear according to claim 9. Accordingly, an aircraft landing gear, in particular a nose landing gear, provides a rotatably arranged rotary steering tube which is directly or indirectly connected with the landing gear wheel. A rotary movement of the rotary steering tube effects a steering deflection of the landing gear wheel. In accordance with the present disclosure, a measuring arrangement is provided, which permits a contactless detection of the steering angle of the aircraft wheel.

It can be provided that the measuring arrangement provides a measuring scale which is coaxially arranged around the rotary steering tube of the aircraft landing gear. The measuring scale completely extends around the circumference of the rotary steering tube, so that both components have the same axis of rotation. A sensor mounted at a distance from the measuring scale inside the aircraft landing gear detects the steering deflection of the landing gear wheel in a contactless manner with reference to the measuring scale.

The used measuring scale may be fixed to the rotary steering tube of the aircraft landing gear by bonding and/or by shrinking and/or screwing and/or welding.

The present disclosure furthermore relates to a method for detecting the steering angle of an aircraft landing gear. In accordance with the method of the present disclosure, tapping the actual deflection angle of the nose landing gear is effected in a contactless manner. A mechanical coupling of sensor unit and measurement object is omitted. It is conceivable that a continuously generated measurement signal is permanently transmitted to the landing gear computer. With the method of the present disclosure, a measurement resolution in the range from 1° to 1.5° can be achieved.

Advantageously, the actual steering angle of the aircraft landing gear is determined in a contactless manner by means of a magnetostrictive measuring method. Such measuring method relies on the use of magnetic sensors which operate on the basis of a magnetic action principle and detect the current steering deflection of the aircraft landing gear. Particularly, the method of the present disclosure employs an apparatus for detecting the steering angle of an aircraft landing gear as described herein Further features, details and advantages of the present disclosure will be explained in detail with reference to the embodiments illustrated in the drawings.

DETAILED DESCRIPTION

Figure 1:
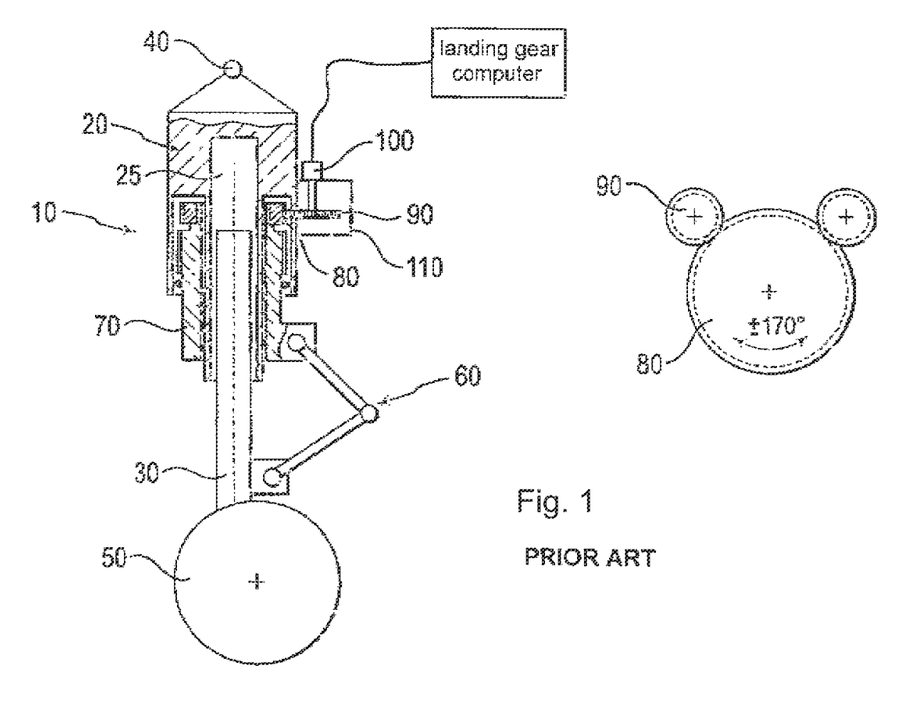
FIG. 1 shows a schematic diagram of a conventional steering angle detection of a nose landing gear according to the prior art.

FIG. 1 shows a schematic diagram of a steerably designed nose landing gear which is rigidly or retractably mounted at the front fuselage region of the aircraft. Inside the nose landing gear a steering angle detection is integrated, which feeds the current steering deflection of the nose wheel back to the pilot.

FIG. 1 shows a nose landing gear 10 known according to the prior art with a conventional steering angle detection. The nose landing gear 10 performs the function of a shock absorber which is formed of the landing gear housing 20 and the thrust tube 30 rotatably mounted in the cylinder 25 of the landing gear housing 20. The landing gear housing 20 is mounted to the aircraft at the mounting point 40. At the lower end of the thrust tube 30, the landing gear wheel 50 is rotatably mounted about a horizontal axis and the opposite end is longitudinally movably mounted in the cylinder 25 of the landing gear housing 20. To steer in the thrust tube 30 and the landing gear wheel 50 during retraction and extension, the thrust tube 30 is connected with the rotary steering tube 70 via the toggle lever 60. The rotary movement of the rotary steering tube 70 about a vertical axis of rotation is generated by means of a non-illustrated drive motor and transmitted to the thrust tube 30 and the landing gear wheel 50 via the toggle lever 60. The steering deflection of the nose landing gear is measured by means of the steering angle sensor unit. This unit comprises the feedback gear wheel 80 rigidly arranged coaxially to the rotary steering tube 70, which is also rotated during the steering movement. The feedback gear wheel 80 engages in an adjacent reduction gear wheel 90, which is connected with the position sensor 100 via a shaft. This unit in the form of a transmission housing 110 is attached to the landing gear housing from outside.

Figure 2:
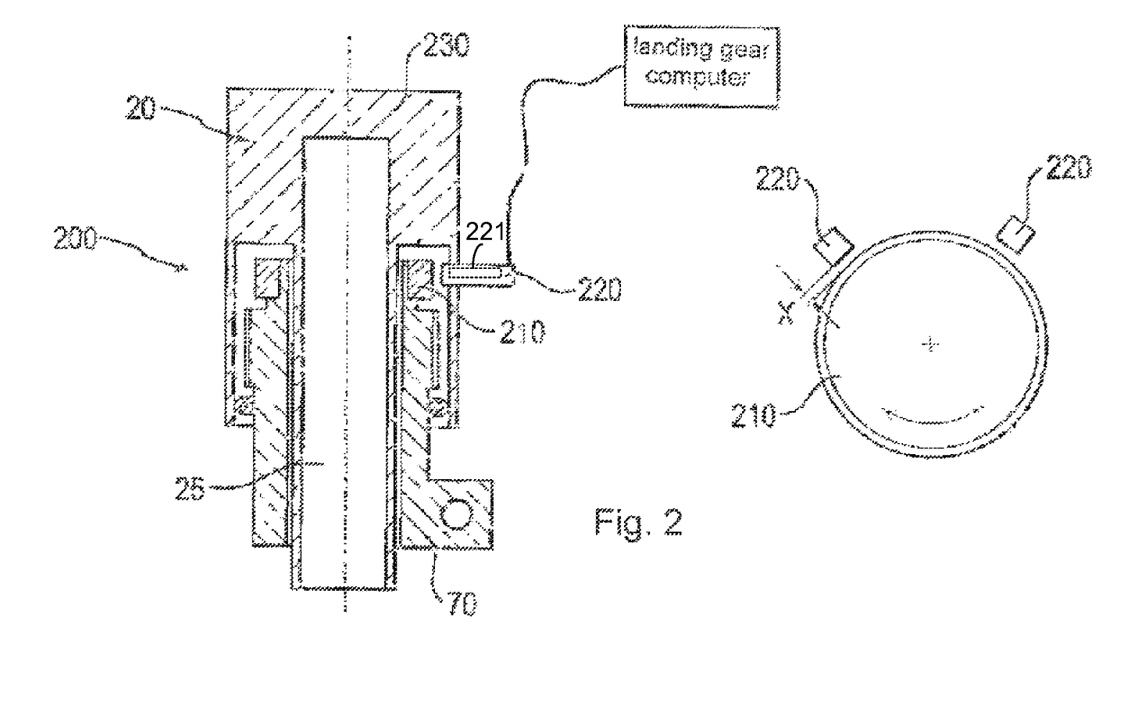
FIG. 2 shows a schematic diagram of the contactless steering angle detection of a nose landing gear in accordance with the present disclosure.

The nose landing gear 200 of the present disclosure is shown in FIG. 2. The mechanical coupling between feedback gear wheel 80 and reduction gear wheel 90 is omitted, in order to avoid wear phenomena at the components contacting each other. Instead, a contactless detection of measured values is realized in accordance with the present disclosure.

The realization in accordance with the present disclosure on the one hand replaces the transmission 110 and the potentiometer 100 from FIG. 1 by the magnetic field sensor 220. As counterpart the ring-shaped measuring scale 210 is used instead of the feedback gear wheel 80. The measuring scale 210 coaxially surrounds the entire circumference of the rotary steering tube 70 and is fixed to the same by bonding, welding or screwing. Shrinking the measuring scale 210 onto the rotary steering tube 70 is conceivable as an alternative. The ring width of the measuring scale 210 lies in a range between 15 and 30 mm. The magnetic sensor 220 typically is firmly mounted at the landing gear housing 20 by means of a screw connection typically at a distance of 0.5 to 1.5 mm to the measuring scale 210. For safety reasons, at least two magnetic sensors 220 are redundantly arranged relative to each other, so that a faulty behavior of a sensor can be detected.

The measuring scale 210 bears a coding and/or signature, which unambiguously identifies or characterizes each point of the circumference of the rotary steering tube 70. Configurations of the measuring scale 210 with a corresponding signature/coding, which allow an absolute value detection of the steering angle in the full range of rotation from 0° to 360°, are conceivable. A special coding in addition provides for outputting the absolute values for the steering angle in ranges above 360°.

Figure 3:
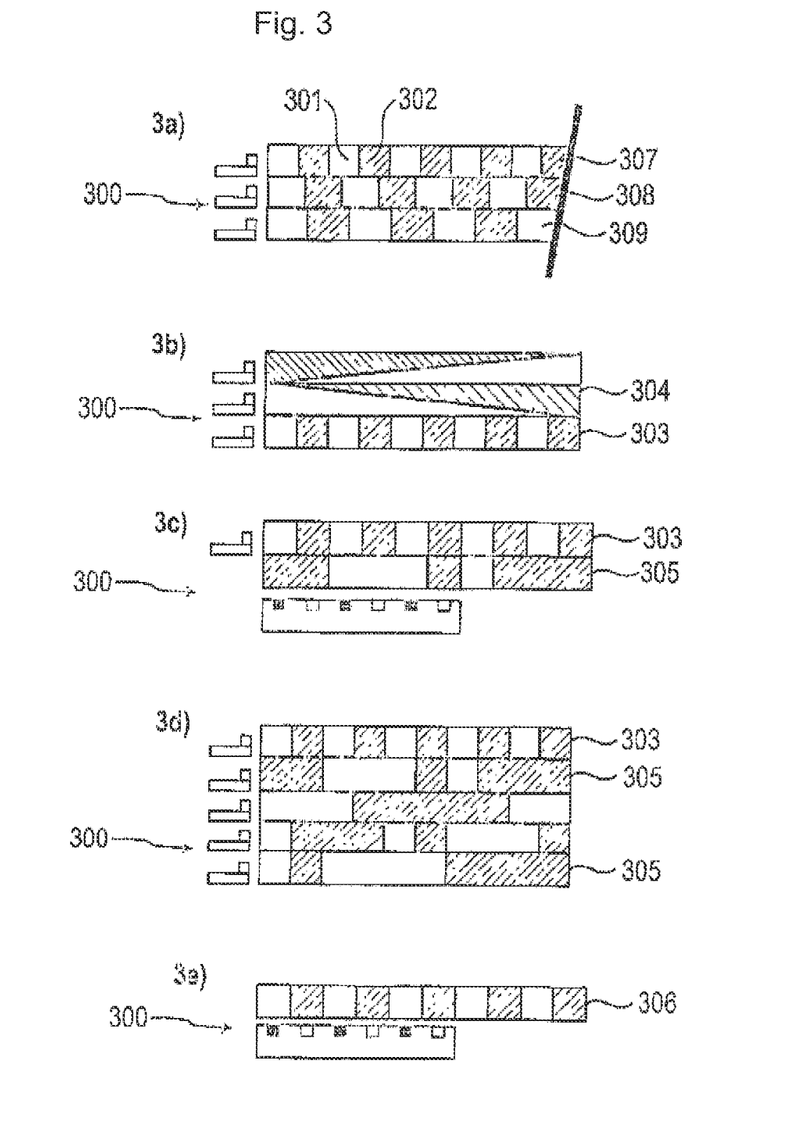
FIG. 3 shows various coding examples for an active measuring scale.

In FIG. 3, various coding examples for an active measuring scale 300 are illustrated. The active measuring scale 300 is a ring-shaped magnetic tape made of permanent-magnetic material, which includes a multitude of magnetic fields for realizing a coding and/or signature. By precisely magnetizing the permanent-magnetic material of the magnetic tape, pole lengths in the range from 0.1 to 5 mm are generated. Suitable sensors 220 for reading out the active measuring scale 300 include in particular Hall or AMR magnetic field sensors.

The coding examples represented in FIG. 3 are realized by means of the described active measuring scale 300 and/or by means of the magnetic tape. The magnetic tape can have a single- or multi-track design. The individual tracks of the magnetic tape are detected and evaluated in parallel by one or more reading heads of the sensor 220. Example 3a shows a measuring scale 300 which realizes a vernier for increasing the reading accuracy in that three tracks 307, 308, 309 extending parallel to each other are arranged one below the other. The tracks include individual magnetic fields 301, 302 with different field properties and can be detected and analyzed by means of the sensor 220.

Example 3b of the measuring scale 300 consists of an incremental track 303 and a coarse absolute track 304 which permits an unambiguous identification of each angle of rotation of the rotary steering tube 70. The examples from 3c, 3d each combine an incremental track with a certain number n of code tracks 305. The remaining example 3e consists of a single code track 306 which is provided in the form of an incremental track.

Figure 4:
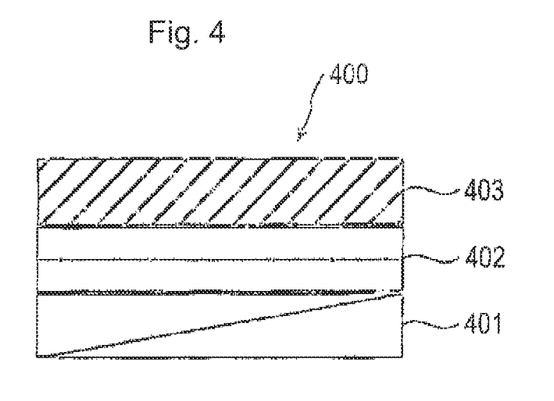
FIG. 4 shows a possible signature of a passive measuring scale.

In the following section (cf. FIG. 4) the realization of the steering angle detection by means of a passive measuring scale 400 will be explained as an alternative embodiment. The passive measuring scale 400 has a ring-shaped body which substantially is made of a ferromagnetic material. On the surface of the ring-shaped passive measuring scale 400 a mechanical structuring is provided, which depicts any type of signature or coding. For an absolute steering angle measurement the passive measuring scale 400 is configured with a helical signature by means of the three tracks 401, 402, 403. The absolute angle determination is effected with the lowermost track 401, which depicts a thread pitch over the entire circumference of the rotary steering tube 70. The uppermost track 403 represents a refined measuring scale for increasing the resolution of the detected steering angle. The middle track 402 serves as a correction track, in order to compensate axial displacements of the rotary steering tube 70. To magnetize the ferromagnetic material, an auxiliary magnet 221 is arranged behind the sensor 220. For scanning the ferromagnetic material GMR sensors are particularly useful. At least one sensor 220 synchronously scans the tracks 401, 402, 403 extending parallel to each other. Expediently, one or more independent reading heads for the parallel scanning of the tracks are arranged inside at least one sensor 220, which allow a simultaneous detection and evaluation of the different measurement signals.

Figure 5:
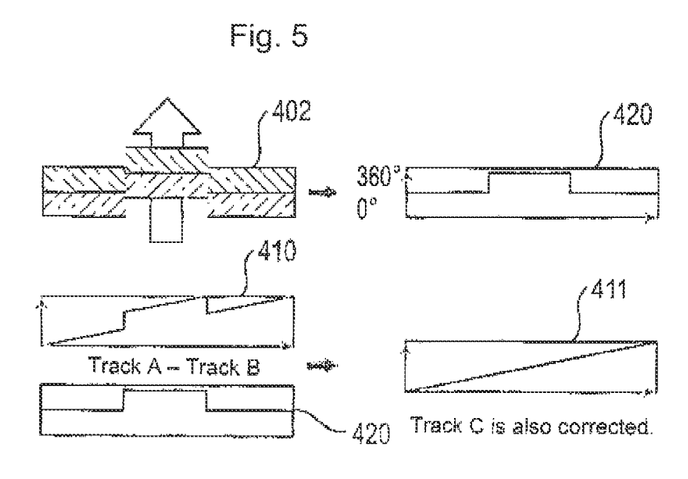
FIG. 5 shows a schematic diagram of an axial track correction.

The signal representations shown in FIG. 5 explain the principle of the correction track 402. Due to the shock-absorbing properties of the landing gear 200, axial displacements of the rotary steering tube 70 and of the measuring scale 400 can occur and lead to faulty measurements. The correction track 402 depicts a constant measurement signal which is constantly present in the full range of steering angles. The deviation of the tapped measurement signal 420 results from a time-limited axial displacement of the measuring scale 400 and the correction track 402. The kind and extent of the signal deviation point to the axial displacement of the measuring scale 400 and are used for compensating the measurement signals 410 tapped at the remaining tracks 401, 403. The reference numeral 411 designates the compensated measurement signal of the track 401.

Another possibility is the use of gear wheels in a vernier arrangement for realizing the measuring scale 210. Each gear wheel is representative of a track of the measuring scale 210. To realize a plurality of different measurement resolutions, the individual track profiles are provided with different numbers of teeth.

The invention claimed is:
1. An aircraft landing gear, comprising: a rotatable rotary steering tube which is connected with a landing gear wheel so that a steering deflection of the landing gear wheel is achieved by rotating the rotary steering tube; a landing gear computer; and a measuring arrangement for contactless steering angle measurement of the landing gear wheel, the measuring arrangement including at least two sensors and a measuring scale being made of a permanent-magnetic material and having multiple tracks including a correction track and one or more other tracks and a magnetic signature, wherein the correction track is configured to compensate axial displacements of the rotary steering tube, wherein each of the at least two sensors detects a measurement signal from the correction track and a measurement signal from each of the one or more other tracks and transmits the measurement signals from the correction track and the one or more other tracks to the landing gear computer wherein for each one of the sensors the landing gear computer is configured to compensate the measurement signal from each of the one or more other tracks based on a deviation of the measurement signal from the correction track of a respective one of the sensors, the deviation occurring due to an axial displacement of the measuring scale, wherein each of the at least two sensors includes at least one reading head per track of the multiple tracks and is configured to scan the multiple tracks in parallel such that each of the multiple tracks is scanned by multiple reading heads, and wherein the measuring scale is directly fixed to the rotary steering tube.

2. The aircraft landing gear according to claim 1, wherein at least one of the sensors is a magnetic sensor.

3. The aircraft landing gear according to claim 1, wherein the measuring scale comprises a ferromagnetic material and includes a mechanical signature, the mechanical signature including a tooth structure.

4. The aircraft landing gear according to claim 1, wherein at least one of the sensors is a Hall or AMR magnetic field sensor or GMR sensor.

5. The aircraft landing gear according to claim 1, wherein behind the at least two sensors, an auxiliary magnet is arranged.

6. The aircraft landing gear according to claim 1, wherein the landing gear includes a nose landing gear, and wherein at least one of the sensors is a magnetostrictive sensor.

7. The aircraft landing gear according to claim 1, wherein the measuring scale is arranged coaxially around a center of rotation of the rotary steering tube, and wherein the landing gear comprises a nose landing gear.

8. The aircraft landing gear according to claim 1, wherein the measuring scale is fixed on the rotary steering tube by one or more of bonding, shrinking, screwing, and welding.

9. The aircraft landing gear of claim 1, wherein the at least two sensors are arranged at different locations around a circumference of the measuring scale and at a distance from the measuring scale.

10. The aircraft landing gear of claim 1, wherein the one or more other tracks comprise at least two tracks, and wherein the correction track is disposed between two of the at least two tracks.

11. A method for detecting a steering angle of an aircraft landing gear wheel, wherein the steering angle of the landing gear wheel is detected in a contactless manner by a measuring arrangement, the measuring arrangement including at least two sensors and a measuring scale with multiple tracks including a correction track and one or more other tracks, wherein each of the at least two sensors includes at least one reading head per track of the multiple tracks and is configured to scan the multiple tracks in parallel, and wherein the measuring scale is directly fixed to a rotary steering tube connected with the landing gear wheel, the method comprising detecting a measurement signal from the correction track and a measurement signal from each of the one or more other tracks with each of the at least two sensors and transmitting the measurement signals from the correction track and the one or more tracks to a landing gear computer, wherein for each one of the sensors compensating the measurement signal from each one of the one or more other tracks, using the landing gear computer, based on a deviation of the measurement signal signal from the correction track of a respective one of the sensors, the deviation occurring due to an axial displacement of the measuring scale.

12. The method according to claim 11, wherein at least one of the sensors is a magnetorestrictive sensor.

13. The method according to claim 11, wherein the at least two sensors are arranged at different locations around a circumference of the measuring scale.

\* \* \* \* \*

UNITED STATES PATENT AND TRADEMARK OFFICE
CERTIFICATE OF CORRECTION

| | | |
|---|---|---|
| PATENT NO. | : 9,561,848 B2 | Page 1 of 1 |
| APPLICATION NO. | : 12/976794 | |
| DATED | : February 7, 2017 | |
| INVENTOR(S) | : Anton Straub et al. | |

It is certified that error appears in the above-identified patent and that said Letters Patent is hereby corrected as shown below:

On the Title Page

In item (73) in the assignee section, please delete "Lienherr-Aerospace" and replace with --Liebherr-Aerospace--.

In the Claims

In Column 8, Line 28, Claim 11, please delete the second "signal" following "measurement signal".

Signed and Sealed this
Eleventh Day of April, 2017

Michelle K. Lee
*Director of the United States Patent and Trademark Office*